(No Model.)

G. BOTSFORD & W. HOLTZ.
ROLLER BEARING.

No. 494,055. Patented Mar. 21, 1893.

Witnesses
Harry L. Amer
N. T. Riley

Inventors
George Botsford and
William Holtz.

By their Attorneys,
C. A. Snow & Co.

UNITED STATES PATENT OFFICE.

GEORGE BOTSFORD AND WILLIAM HOLTZ, OF NINEVEH, INDIANA.

ROLLER-BEARING.

SPECIFICATION forming part of Letters Patent No. 494,055, dated March 21, 1893.

Application filed September 13, 1892. Serial No. 445,802. (No model.)

*To all whom it may concern:*

Be it known that we, GEORGE BOTSFORD and WILLIAM HOLTZ, citizens of the United States, residing at Nineveh, in the county of Johnson and State of Indiana, have invented a new and useful Roller-Bearing Axle, of which the following is a specification.

The invention relates to improvements in axle bearings.

The object of the present invention is to enable the ordinary construction of axle box to be dispensed with and to provide end bearings for a hub and axle which will be substantially frictionless and which will not wear either the axle or the hub and in which any parts when worn may be readily replaced by new parts.

The invention consists in the novel combination and arrangement of parts hereinafter fully described, illustrated in the accompanying drawings and pointed out in the claim hereto appended.

Figure 1:
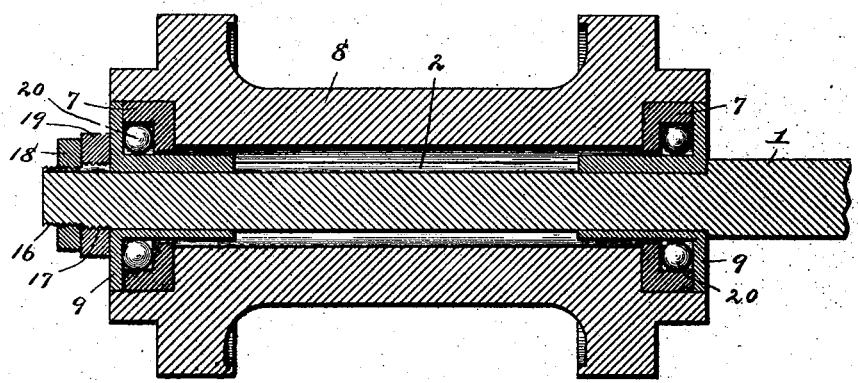
Figure 2:
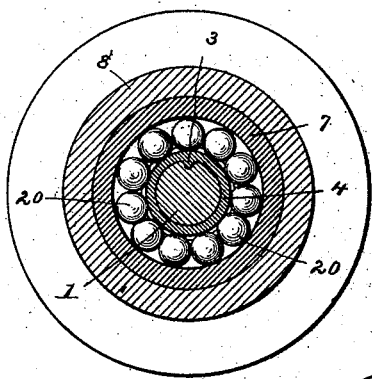
Figure 3:
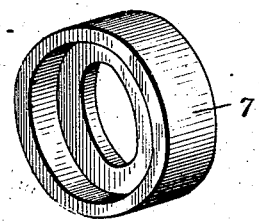
Figure 4:
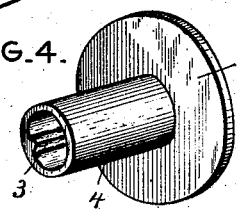

In the drawings,—Figure 1 is a longitudinal sectional view of a hub showing axle bearings constructed in accordance with this invention. Fig. 2 is a transverse sectional view. Fig. 3 is a detail perspective view of the annular bushings. Fig. 4 is a detail perspective view of one of the sleeves.

Like numerals of reference designate corresponding parts in all the figures of the drawings.

1 designates a spindle of an axle provided with a longitudinal V-shaped groove 2 which is engaged by interior V-shaped ribs 3 of end sleeves 4 arranged at the ends of the spindle and forming the bearing surface thereof. The sleeves which are securely held against rotation on the axle by the V-shaped or triangular ribs and groove have arranged on them a series of balls 20 which are arranged in annular bushings 7 located in annular recesses in the ends of a hub 8. The annular bushings consist of a disk having a central opening for the reception of the spindle and sleeve and an annular tubular or cylindrical flange receiving the balls, and the mouth of the bushing is closed by an annular flange or disk 9 arranged at the outer end of each of the sleeves 4. By this construction the bearing of the hub on the spindle is at each end of the hub and ball bearings are provided as the balls are arranged or interposed between the tubular portion or flange of the bushing and the sleeve 4 of the spindle. The outer end of the spindle is provided with right and left hand threads 16 and 17 on which are arranged right and left hand nuts 18 and 19, thereby preventing the hub from accidentally becoming disengaged from the spindle.

It will be seen that the end bearings are simple and inexpensive in construction, that they may be readily applied to a hub, that they obviate the necessity of employing an axle box and that all wear is taken from both the hub and the spindle, thereby preventing the necessity of replacing those parts. It will also be apparent that the wear is received on the balls and the bushing and the sleeve and that any of these parts may be readily replaced by new parts from time to time.

What we claim is—

The combination with a spindle having a longitudinal groove and terminating at the inner end of the latter with a shoulder, and a hub having annular recesses at its ends, of cylindrical bushings L-shaped in cross-section arranged within the recesses of the hub and of less depth than the recesses and leaving outer annular spaces, sleeves provided with interior ribs engaging the groove of the spindle, said sleeves being provided at their outer ends with integral annular flanges conforming to the cylindrical bushings and closing the mouths of the same and fitting in said annular spaces, balls arranged within the bushings and mounted on the sleeves, and a nut arranged at the outer end of the spindle, substantially as described.

In testimony that we claim the foregoing as our own we have hereto affixed our signatures in the presence of two witnesses.

GEORGE BOTSFORD.
WILLIAM HOLTZ.

Witnesses:
W. N. DRYBREAD,
F. BASWELL.